United States Patent Office 3,563,755
Patented Feb. 16, 1971

3,563,755
TETRAAZAINDENE-STABILIZED PHOTOGRAPHIC EMULSIONS
George De W. Anderson, Hatfield Broad Oak, near Bishops Stortford, and Ronald E. Watts, Bishops Stortford, England, assignors to Minnesota Mining and Manufacturing Company, St. Paul, Minn., a corporation of Delaware
No Drawing. Filed Dec. 5, 1967, Ser. No. 688,022
Claims priority, application Great Britain, Dec. 9, 1966, 55,364/66
Int. Cl. G03c 1/34
U.S. Cl. 96—109                                    2 Claims

ABSTRACT OF THE DISCLOSURE

Tetraazaindene compounds having the formula

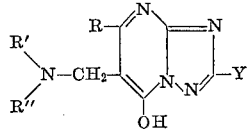

in which R represents a hydrogen atom, an alkyl group or an alkylthio group, R' and R" individually represent a hydrogen atom, a lower alkyl group or together form a 5 or 6 membered heterocyclic ring, Y represents a hydrogen atom or an alkyl, alkylthio, aryl or amine group; and the salts thereof. This invention also describes the preparation of the abovementioned compounds and their use in photographic emulsions.

---

This invention relates to organic heterocyclic compounds and is especially concerned with substituted tetraazaindene compounds which are capable of being used as stabilizers for photographic emulsions.

Tetraazaindene compounds in accordance with the invention can be represented by the general formula:

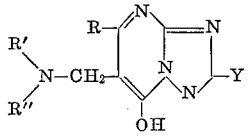

in which R represents a hydrogen atom, an alkyl or an alkylthio group, R' and R" individually represents a hydrogen atom, a lower alkyl group, or together form part of a 5 or 6 membered heterocyclic ring, and Y represents a hydrogen atom or an alkyl, alkylthio, aryl or amino group; and the salts thereof.

These compounds are useful as stabilizers for photographic emulsions into which they can be incorporated. They also have the advantage over tetraazaindene compounds which are not substituted in the 5 position that they have a greater solubility in aqueous gelatin and so can be more readily incorporated in the emulsion.

The tetraazaindene compounds in accordance with the invention can be prepared by reacting a tetraazaindene compound represented by the general formula:

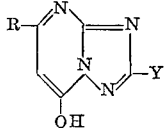

in which R and Y are as set out above, with formaldehyde or paraformaldehyde and in amine containing the following general group:

in which R' and R" are as set out above.

The reaction is best conducted under substantially non-aqueous conditions in, for example, dimethyl sulphoxide or butanol. Normally about 5 moles of formaldehyde or paraformaldehyde and 10 moles of the amine are used per mole of the tetraazaindene but these proportions are not critical. It is, however, usually important to maintain the reactants at the lowest temperature at which reaction occurs, which is usually between 20 and 90° C. The product usually crystallizes out of the resulting solution, by cooling if necessary. In certain instances this is obtained as the free Mannich compound. In other cases, the product crystallizes out as a salt of the Mannich compound and excess of the amine. It is important to remove the salt forming amine to obtain optimum stabilizing effect. This may be achieved, for example, by treating an aqueous solution of the amine salt with an acid forming a sparingly soluble salt of the Mannich compound, or alternatively, the amine salt may be dissolved in the theoretical quantity of aqueous sodium hydroxide and evaporated to dryness at as low a temperature as possible to obtain the sodium salt.

The preparation of tetraazaindene compounds in accordance with the invention will now be illustrated with reference to the following examples.

EXAMPLE 1

4 - hydroxy - 6 - methyl - 2-methylthio-1:3:3a:7-tetraazaindene (4.9 g.), paraformaldehyde (3.8 g.), and dimethyl sulphoxide (40 ml.) were placed in a flask fitted with stirrer, dropping funnel and condenser. The mixture was warmed to dissolve the tetraazaindene and cooled to room temperature. Diethylamine (26 ml.) was added slowly and the temperature rose to 54° C. and was not allowed to exceed 60° C. The reaction mixture separated into two clear liquid phases and the flask was then cooled in cold water.

The colorless precipitate was filtered off, washed with acetone and recrystallized from ethanol. This gave a yield of 6.5 g. of the amine salt in the form of colorless needles having a melting point of 168° C.

*Analysis.*—Calculated for $C_{12}H_{19}N_5OOS + (C_2H_5)_2NH$ (percent): C, 54.3; H, 8.4; N, 23.6. Found (percent): C, 54.1; H, 8.4; N, 23.4.

This amine salt (5 g.) was dissolved in water, adjusted to a pH of 2.0 by adding 2-N nitric acid. On standing, the nitrate crystallized out. It was filtered off and recrystallized from water to give 4.0 g. of colorless needles, M.P. 170–175° C. (with decomposition).

*Analysis.*—Calculated for $C_{12}H_{19}N_5OS + HNO_3$ (percent): C, 41.9; H, 5.8; N, 24.4; S, 9.3. Found (percent): C, 42.0; H, 5.9; N, 23.6; S, 9.5.

The presence of the nitrate ion was confirmed and the indicated structure is:

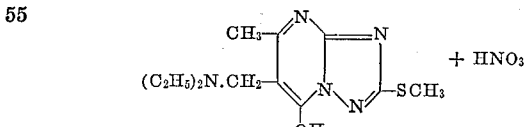

EXAMPLE 2

Dimethyl sulphoxide (400 ml.) was placed in a flask fitted with dropping funnel, stirrer and condenser and was heated to 50° C. 4-hydroxy-6-methyl-1:3:3a:7-tetraazaindene (37.5 g.) was then added. When all had dissolved, paraformaldehyde (38 g.) was added and the flask cooled to 30° C. Diethylamine (260 ml.) was added slowly and the temperature rose to 53° C. and was not allowed to exceed 60° C. The reaction mixture separated into two clear liquid phases. The flask was then cooled in cold water and a white precipitate formed which was filtered off and washed with ether to give 66.0 g. of the colorless amine salt having a melting point of 148° C. with decomposition.

*Analysis.*—Calculated for $C_{11}H_{17}N_5O+(C_2H_5)_2NH$ (percent): C, 58.5; H, 9.1; N, 27.3. Found (percent): C, 58.5; H, 9.2; N, 27.5.

The amine salt (6.16 g.) was dissolved in 20 ml. of N/l. sodium hydroxide and the solution evaporated to dryness in vacuum at room temperature. The resulting colorless crystals were washed with acetone and dried to obtain the sodium salt.

The indicated structure of the free acid is:

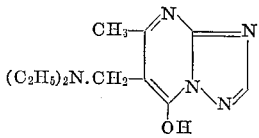

EXAMPLE 3

2-ethylthio-4-hydroxy - 6 - methylthio-1:3:3a:7-tetraazaindene (4 g.), paraformaldehyde (2.5 g.) and dimethyl sulphoxide (26.5 ml.) were placed in a flask fitted with stirrer, dropping funnel and condenser. Diethylamine (17 ml.) was slowly added and, during the addition, the temperature rose to 40° C. The mixture was then heated to 65° C. for 15 minutes and the reaction mixture formed two clear liquid phases. After cooling, the solid formed was filtered off, washed with acetone and crystallized from aqueous ethanol to obtain 3.4 g. of colorless plates melting with decomposition at 155–6° C.

*Analysis.*—Calculated for $C_{13}H_{21}N_5OS_2$ (percent): C, 47.7; H, 6.4; N, 21.4; S, 19.6. Found (percent): C, 47.9; H, 6.6; N, 21.2; S, 19.1.

Indicated structure:

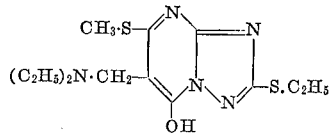

EXAMPLE 4

4-hydroxy-6-methyl - 2 - methylthio-1:3:3a:7-tetraazaindene (4.9 g.), paraformaldehyde (1.56 g.) and butanol (40 ml.) were placed in a flask fitted with stirrer, dropping funnel and condenser. Diethylamine (2.6 ml.) was added and the reaction mixture heated at 55° C. for 30 minutes. The white solid formed was filtered off, washed with acetone and dried to obtain 1.3 g. of colorless rectangular plates which melted with decomposition at 150 to 155° C.

*Analysis.*—Calculated for $C_{12}H_{19}N_5OS$ (percent): C, 51.3; H, 6.8; N, 24.9; S, 11.4. Found (percent): C, 51.1; H, 6.9; N, 24.9; S, 11.5.

This product had the indicated structure of the free Mannich compound corresponding to the nitrate described in Example 1.

EXAMPLE 5

4-hydroxy-6-methyl-1:3:3a:7-tetraazaindene (7.5 g.), paraformaldehyde (7.5 g.) and n-butanol (50 ml.) were placed in a flask fitted with stirrer, dropping funnel and condenser. Piperidine (50 ml.) was added slowly and the temperature rose to 54° C. This temperature was maintained for one hour, during which time most of the solid dissolved to give a pale yellow solution. The slight residue was filtered off and the butanol removed using a rotary film evaporator to give a viscous oil. The addition of diethyl ether caused this to crystallize and the solid was filtered off. Two recrystallizations from a mixture of ethanol and acetone yielded 6 g. of colorless needles melting with decomposition at 214 to 218° C.

*Analysis.*—Calculated for $C_{12}H_{17}N_5O$ (percent): C, 58.5; H, 6.9; N, 28.4. Found (percent): C, 58.5; H, 7.1; N, 28.8.

Indicated structure:

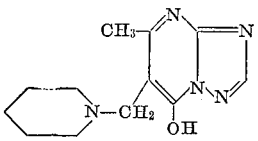

EXAMPLE 6

4-hydroxy-6-methyl - 2 - methylthio-1:3:3a:7-tetraazaindene (11.8 g.), piperidine (6.5 ml.) 35% formalin (5 ml.), and ethanol (50 ml.) were placed in a flask fitted with a condenser and stirrer and refluxed for 40 minutes. The solid rapidly dissolved and a white precepitate soon started to form. The reaction mixture was cooled and the white solid filtered off. The products were recrystallized from a mixture of methanol and water to obtain 14 g. of colorless cubic crystals having a melting point of 170° C. with decomposition.

*Analysis.*—Calculated for $C_{13}H_{19}N_5SO.2H_2O$ (percent): C, 47.5; H, 7.0; N, 21.2; S, 9.8. Found (percent): C, 47.8; H, 6.9; N, 21.1; S, 10.0.

Indicated structure:

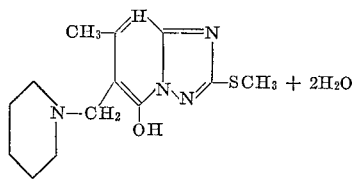

EXAMPLE 7

4-hydroxy-6-methyl-2-methylthio-1:3:3a:7 - tetraazaindene (19.6 g.), paraformaldehyde (15.2 g.) and n-butanol (80 ml.) were placed in a flask fitted with stirrer, condenser and dropping funnel. Morpholine (87 ml.) was added slowly and the reaction mixture heated at 60° C. for 30 minutes during which time all the solid dissolved. The reaction mixture was cooled, and the white solid which formed was filtered off and washed with ether. The product was found to be the morpholine salt of the rerequired compound. To convert it to the nitrate it was suspended in ethanol and acidified with 2 N nitric acid. When the suspension had all dissolved the product slowly precipitated and after filtering off was recrystallized from a mixture of acetone and water. This gave a yield of 17 g. of colorless hexagonal plates having a melting point of 192° C. with decomposition.

*Analysis.*—Calculated for $C_{12}H_{17}N_5O_2S.HNO_3$ (percent): C, 40.0; H, 5.3; N, 23.6; S, 9.0. Found (percent): C, 40.0; H, 5.0; N, 23.4; S, 9.4.

Indicated structure:

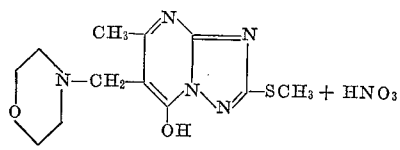

EXAMPLE 8

2-amino-4-hydroxy-6-methyl-1:3:3a:7 - tetraazaindene (16.5 g.), paraformaldehyde (6 g.), and dimethyl sulphoxide (100 ml.) were placed in a flask fitted with stirrer, dropping funnel and condenser. Diethylamine (53 ml.) was added slowly and the temperature rose to 44° C. The reaction mixture was heated to 55° C. and this temperature maintained for twenty minutes. During this time the reaction mixture turned yellow, mostly dissolved and formed two phases. On cooling white crystals separated and were filtered off, washed with acetone and recrystallized from a mixture of methanol and ether. After a further from a mixture of methanol and ether. After a further recrystallization from a mixture of acetone and water, 7 g.

of colorless needles were obtained which turned brown but did not melt below 360° C.

*Analysis.*—Calculated for $C_{11}H_{18}N_6O$ (percent): C, 52.8; H, 7.2; N, 33.6. Found (percent): C, 52.7; H, 7.4; N, 33.8.

Indicated structure:

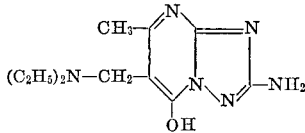

EXAMPLE 9

4-hydroxy-6-methyl-1:3:3a:7-tetraazaindene (15 g.), paraformaldehyde (6 g.), and dimethyl sulphoxide (50 ml.) were placed in a flask fitted with stirrer, dropping funnel and condenser. 2-ethylaminoethanol (50 ml.) was added and the temperature rose slowly to 43° C. with most of the solid material dissolving. After heating for 30 minutes at 55° C. all the solid had dissolved to give a faintly yellow solution. Removal of the solvent in a rotary film evaporator gave a viscous oil which crystallized on treatment with boiling acetone. The crystals were filtered off, washed with acetone and recrystallized twice from a mixture of methanol and acetone to give 10 g. of colorless cubic crystals melting with decomposition at 152–154° C.

*Analysis.*—Calculated for $C_{11}H_{17}N_5O_2$ (percent): C, 52.7; H, 6.8; N, 27.9. Found (percent): C, 53.0; H, 7.2; N, 27.7.

Indicated structure:

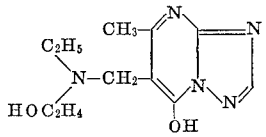

EXAMPLE 10

4-hydroxy-2-methylthio-1:3:3a:7 - tetraazaindene (9.1 g.) paraformaldehyde (3 g.) and dimethyl sulphoxide (50 ml.) were placed in a flask fitted with stirrer, dropping funnel and condenser. Diethylamine (26 ml.) was added and the temperature rose to 38° C. with most of the solid dissolving and the formation of two liquid phases. After heating at 55° C. for 30 minutes the slight residue was filtered off and the liquid evaporated to give a gummy residue which crystallized on stirring with acetone. The solid was filtered off, washed with acetone and recrystallized twice from a mixture of methanol and diethyl ether. This yielded 1.5 g. of colorless rectangular crystals melting with decomposition at 170–172° C.

*Analysis.*—Calculated for $C_{11}H_{17}N_5OS$ (percent): C, 49.5; H, 6.4; N, 26.2; S, 12.0. Found (percent): C, 49.2; H, 6.6; N, 26.5; S, 12.4.

Indicated structure:

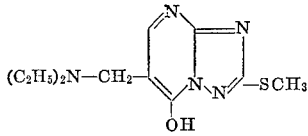

EXAMPLE 11

4-hydroxy-6-methyl-2-phenyl-1:3:3a:7 - tetraazaindene (11.3 g.), paraformaldehyde (3 g.) and dimethyl sulphoxide (50 ml.) were placed in a flask fitted with stirrer, dropping funnel and condenser. Diethylamine (26 ml.) was added and the temperature rose to 49° C. The solid present did not dissolve but changed in appearance and remained the same after heating for 30 minutes at 55° C. The glistening white plates were filtered off and recrystallized twice from a mixture of methanol and ether to obtain 9 g. of colorless hexagonal plates which did not melt below 360° C.

*Analysis.*—Calculated for $C_{17}H_{21}N_5O$ (percent): C. 65.7; H, 6.8; N, 22.5. Found (percent): C, 65.4; H, 7.1; N, 22.6.

Indicated structure:

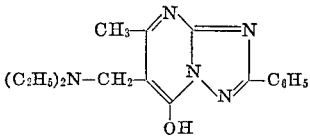

EXAMPLE 12

4-hydroxy-2-methyl-6-methylthio-1:3:3a:7 - tetraazaindene (9.8 g.), paraformaldehyde (7.6 g.) and n-butanol (80 ml.) were placed in a flask fitted with a stirrer, dropping funnel and condenser. Diethylamine (52 ml.) was added slowly and the temperature rose to 50° C. The reaction mixture was heated at 55° C. for 10 minutes to dissolve all the solid. The solvent was removed in a rotary film evaporator and diethylether was added to the residue to give a yellow solid. This was recrystallized from a mixture of acetone and water to obtain 8.6 g. of colorless needles which melted at 179–181° C. with decomposition.

*Analysis.*—Calculated for $C_{12}H_{19}N_5OS$ (percent): C, 51.3; H, 6.8; N, 24.9; S, 11.4. Found (percent): C, 51.4; H, 6.8; N, 24.9; S, 11.8.

Indicated structure:

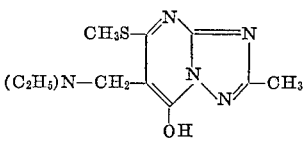

The tetraazaindene compounds in accordance with the invention have been found to be very effective as stabilizers for photographic silver halide emulsions. As is well known, light sensitive silver halide emulsions tend to yield, on development, a deposit of silver in those areas which have not been exposed to light. This deposit, which is commonly termed "chemical fog" impairs the quality of the image and, indeed, in certain cases may obliterate the image. The tendency to form this fog is more pronounced when the emulsion is of a highly sensitive type and also when the emulsions are stored under adverse conditions, as, for example, under the conditions of high temperature and high humidity which are met with in tropical countries. In order to counteract the tendency of silver halide emulsions to form this fog it is common practice to add to them so-called stabilizers. Most of the compounds used as stabilizers are successful to a high degree in preventing the formation of fog, but many of them suffer from the disadvantage that they reduce the sensitivity of the emulsion and also slow down the rate of development of the photographic image.

The heterocyclic compounds of the invention, on the other hand, although effective in preventing the formation of fog, do not cause any decrease in the sensitivity of the emulsions, and indeed, in some cases they may even increase the sensitivity. It is found that particularly good results are obtained when the substituents Y, R, R' and R" in the formulae of the reactants given above contain not more than 4 carbon atoms.

Best results have been obtained with emulsions containing from 5 mg. to 3.0 g. per gram mole of silver present in the emulsion. The stabilizing compounds will normally be added at the completion of chemical ripening or digestion of the emulsion, although it may sometimes be possible for the addition to take place at an earlier stage in the preparation of the emulsion. At whatever stage is chosen the solids may be introduced by themselves or as solution in inert solvents such as water or ethanol.

The compounds need not necessarily be directly added to the silver halide emulsions in order to give protection trast value ($\gamma$) were then measured. The results obtained are given below in the table.

TABLE

| Compound | Quantity, millimoles/ mole Ag | 4 days under ordinary conditions | | | 4 days incubation at 125° F. and 70% R.H. | | |
|---|---|---|---|---|---|---|---|
| | | Fog | $\gamma$ | Relative speed 0.5 above fog | Fog | $\gamma$ | Relative speed 0.5 above fog |
| None | | 0.16 | 1.55 | 1.20 | 0.33 | 1.47 | 1.13 |
| Compound prepared in Example 1 (nitrate) | 0.5 | 0.18 | 1.8 | 1.18 | 0.19 | 1.7 | 1.20 |
| | 1.75 | 0.20 | 2.35 | 1.21 | 0.18 | 1.75 | 1.22 |
| | 3.0 | 0.20 | 2.0 | 1.22 | 0.21 | 1.6 | 1.23 |
| None | | 0.13 | 2.1 | 1.20 | 0.26 | 1.90 | 1.12 |
| Compound prepared in Example 4 | 0.5 | 0.14 | 2.3 | 1.22 | 0.18 | 2.0 | 1.26 |
| | 1.75 | 0.15 | 2.45 | 1.22 | 0.20 | 2.3 | 1.27 |
| | 3.0 | 0.15 | 2.15 | 1.22 | 0.18 | 2.15 | 1.23 |
| None | | 0.13 | 1.8 | 1.06 | 0.17 | 1.8 | 0.95 |
| Compound prepared in Example 5 | 0.5 | 0.13 | 1.8 | 1.09 | 0.13 | 2.1 | 1.08 |
| | 1.75 | 0.14 | 2.1 | 1.12 | 0.13 | 1.4 | 0.98 |
| | 3.0 | 0.15 | 2.1 | 1.16 | 0.15 | 1.8 | 1.05 | to the emulsions against the formation of fog. The compounds have been found effectively to stabilize a layer of silver halide emulsion if that layer is in contact with a layer containing one of the heterocyclic compounds so that at some time during the manufacture of the photographic film the stabilizer can diffuse into the adjacent emulsion layer. This method of effecting stabilization may be particularly advantageous for photographic films, which contain a number of layers of silver halide emulsion.

The following examples illustrate the stabilizing effect of the heterocyclic compounds in accordance with the invention on a silver halide photographic emulsion.

EXAMPLE 13

A silver iodobromide photographic emulsion was ripened to about 1.2 micron average grain diameter, then washed and digested in the presence of sodium thiosulphate and gold until it reached its maximum speed. This was divided into portions which were separately treated with 0.5 millimole, 1.75 millimoles and 3.0 millimoles of stabilizer per mole of silver present in the emulsion. The resulting admixture was coated onto a film base and dried. A further sample of the emulsion was coated without addition of stabilizer.

One sample of each coating was kept for four days under normal conditions of temperature and humidity while another sample of each was kept for the same period in an incubator at a temperature of 125° F. and a relative humidity of 70% (i.e. under accelerated aging conditions which approximate to a comparatively long shelf life under normal conditions and a somewhat shorter shelf life under tropical conditions). The film was subsequently exposed to light and developed in a standard methol-hydroquinone developer. The speed, fog and contrast value ($\gamma$) were then measured. The results obtained are given below in the table.

From these values it will be observed that the unstabilized emulsion, when subjected to a period of high temperature and humidity, lost speed and gave increased fog, while the speed and fog of the emulsion sample containing the stabilizers of this invention were unaffected by such accelerated storage conditions.

EXAMPLE 14

A silver iodobromide photographic emulsion was ripened to about 1.2 micron average grain diameter, then washed and heated in the presence of sodium thiosulphate and gold until the optimum values of fog, contrast and speed were obtained. This emulsion was cooled rapidly and divided into portions which were separately treated with 0.5 millimole, 1.75 millimoles and 3.0 millimoles per mole of silver present in the emulsion of some of the stabilizers prepared in preceding examples and also a comparison stabilizer which was 4-hydroxy-6-methyl-1:3:3a:7-tetraazaindene, a commonly used commercial stabilizer. The resulting admixture was coated onto a film base and dried. A further sample of the emulsion was coated without addition of stabilizer.

One sample of each coating was kept for 62 hours under normal conditions of temperature and humidity while another sample of each was kept for the same period in an incubator at a temperature of 70° C. and a relative humidity of 30% (i.e. under accelerated aging conditions which approximate to a comparatively long shelf life under normal conditions and a somewhat shorter shelf life under tropical conditions). The film was subsequently exposed to light and developed in a standard metol-hydroquinone developer. The speed, fog and contrast value ($\gamma$) were then measured. The results obtained are given in the following table.

TABLE

| Compound | Quantity, millimoles/ mole Ag | 62 hrs. under ordinary conditions | | | 62 hrs. incubation at 70° C. and 30% R. H. | | |
|---|---|---|---|---|---|---|---|
| | | Fog | Maximum contrast ($\gamma$) | Relative speed 0.5 above fog | Fog | Maximum contrast ($\gamma$) | Relative speed 0.5 above fog |
| None | | 0.10 | 1.44 | 1.58 | 0.27 | 1.37 | 1.53 |
| Standard | 3.0 | 0.08 | 1.33 | 1.64 | 0.15 | 1.46 | 1.63 |
| Compound prepared in Example 1 (nitrate) | 1.75 | 0.10 | 1.47 | 1.56 | 0.13 | 1.39 | 1.69 |
| Compound prepared in Example 4 | 3.0 | 0.14 | 1.23 | 1.50 | 0.14 | 1.65 | 1.57 |
| Compound prepared in Example 5 | 1.75 | 0.08 | 1.30 | 1.64 | 0.11 | 1.45 | 1.61 |
| Compound prepared in Example 6 | 1.75 | 0.12 | 1.62 | 1.56 | 0.11 | 1.73 | 1.59 |
| Compound prepared in Example 7 | 1.75 | 0.13 | 1.43 | 1.58 | 0.14 | 1.57 | 1.66 |
| Compound prepared in Example 9 | 3.0 | 0.13 | 1.28 | 1.64 | 0.10 | 1.45 | 1.62 |
| Compound prepared in Example 10 | 1.75 | 0.17 | 1.23 | 1.60 | 0.12 | 1.48 | 1.63 |
| Compound prepared in Example 11 | 0.5 | 0.09 | 1.48 | 1.59 | 0.10 | 1.43 | 1.42 |
| Compound prepared in Example 12 | 1.75 | 0.10 | 1.30 | 1.54 | 0.16 | 1.34 | 1.53 |

From these values it will be observed that the unstabilized emulsion, when subjected to incubated storage corresponding to accelerated aging, gave increased fog and some loss of speed and contrast, while the speed, fog and contrast of the emulsion samples containing the stabilizers of the invention showed much improved resistance to the same conditions.

The embodiments of the invention in which an exclusive property or privilege is claimed are defined as follows:

1. A silver halide photographic emulsion containing a stabilizing amount of a tetraazaindene compound of the formula

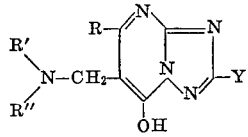

in which R represents a hydrogen atom, an alkyl group or an alkylthio group, R' and R'' individually represent a hydrogen atom, a lower alkyl group or together form a 5 or 6 membered heterocyclic ring, Y represents a hydrogen atom or an alkyl, alkylthio, aryl or amine group; and the salts thereof.

2. The emulsion of claim 1 containing from 5 mg. to 3 g. of said tetraazaindene compound per gram mole of silver present in the emulsion.

References Cited
UNITED STATES PATENTS
3,202,512   8/1965   Williams _____ 96—109

WILLIAM D. MARTIN, Primary Examiner

T. G. DAVIS, Assistant Examiner

U.S. Cl. X.R.

96—94, 107

UNITED STATES PATENT OFFICE
CERTIFICATE OF CORRECTION

Patent No. 3,563,755      Dated February 16, 1971

Inventor(s) George de W. Anderson and Ronald E. Watts

It is certified that error appears in the above-identified patent and that said Letters Patent are hereby corrected as shown below:

Column 4, line 74, delete "from a mixture of methanol a ether. After a further.";

Column 6, lines 30-35 "
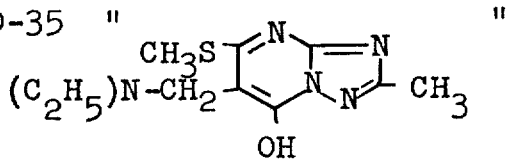
"

should read

-- 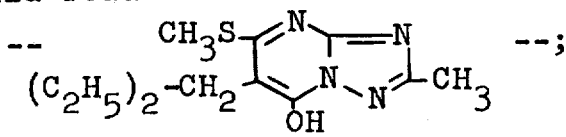 --;

Column 7, line 59, "methol-hydroquinone" should read -- metol-hydroquinone --;

Column 8, line 8 of Table, after "$\tau$", add -- Relative Speed 0.5 above fog --;

Column 8, second to last line in Table at bottom of pa under heading of "Relative Speed 0.5 above fog", "1.42" sh read -- 1.43 --;

Column 8, last line in Table at bottom of page under heading of "Relative Speed 0.5 above fog", "1.53" should r -- 1.52 --.

Signed and sealed this 19th day of September 1972.

(SEAL)
Attest:

EDWARD M. FLETCHER, JR.          ROBERT GOTTSCHALK
Attesting Officer                Commissioner of Patents